United States Patent

[11] 3,548,829

| [72] | Inventors | Frank L. Reynolds |
| | | Monroe; |
| | | Victor A. Thyberg, Fairfield, Conn. |
| [21] | Appl. No. | 769,042 |
| [22] | Filed | Oct. 21, 1968 |
| [45] | Patented | Dec. 22, 1970 |
| [73] | Assignee | Frigitronics, Inc. |
| | | Bridgeport, Conn. |
| | | a corporation of Connecticut |

[54] CRYOSURGICAL INSTRUMENT
10 Claims, 8 Drawing Figs.

[52] U.S. Cl. .................................................. 128/303.1,
128/400; 62/293, 62/514
[51] Int. Cl. ........................................................ A61b 17/36;
F25d 3/00; A61f 7/00; F25b 19/00
[50] Field of Search.............................................. 128/303,
303.1, 254, 399, 400, 400X, 401; 62/55, 292, 293,
514; 165/24, 27

[56] References Cited
UNITED STATES PATENTS

| 3,272,203 | 9/1966 | Chato............................ | 128/303.1 |
| 3,393,679 | 7/1968 | Crump et al.................. | 128/303.1 |
| 3,439,680 | 4/1969 | Thomas........................ | 128/303.1 |
| 3,451,395 | 6/1969 | Thyberg....................... | 128/303.1 |

*Primary Examiner*—Richard A. Gaudet
*Assistant Examiner*—J. B. Mitchell
*Attorney*—Buckles and Bramblett ABSTRACT: A cryosurgical instrument is disclosed which may be operated with either liquid or gaseous refrigerants. A fluid delivery tube is concentrically mounted within a probe and is reciprocable by finger pressure on an external lever to actuate fluid inlet and exhaust valves. A resilient bellows maintains the delivery tube in a position such that the instrument is normally warm. When in this condition, fluid pressure is confined primarily to the delivery tube and, whether the instrument is warm or cold, full fluid pressure is never applied to the bellows.

PATENTED DEC 22 1970

3,548,829

INVENTORS
Frank L. Reynolds
Victor A. Hyberg
BY Wooster, Davis & Cifelli
ATTORNEYS.

3,548,829

1

CRYOSURGICAL INSTRUMENT

BACKGROUND OF THE INVENTION

Cryosurgery has achieved wide acceptance in many fields of medicine. For example, it is widely used in the extraction of cataractous lenses of the eye. In this operation, the lens is removed from the eye by means of a refrigerated probe which is applied to the surface of the lens. The ice ball which is thereby formed within the fluid and tissue of the lens permits the force exerted by the surgeon's hand to be spread over a wide area, permitting withdrawal of the lens with greatly reduced chances of rupture.

Various cryosurgical instruments have been developed which are suitable for cataract extraction in varying degrees. These probes range from simple devices which are cooled by means of immersion in refrigerating agents such as dry ice or liquid nitrogen to more sophisticated devices which may be controlled by the surgeon and selectively warmed or cooled. Devices of the latter type are much to be preferred as the rapid selective warming or cooling permits the surgeon to disengage the probe should he, for example, inadvertently touch an incorrect portion of the eye. An example of such an instrument is that disclosed in U.S. Pat No. 3,393,679 by Ralph E. Crump and Frank J. Reynolds and assigned to the same assignee as the present application. That device is intended for use with a liquid refrigerant such as dichlorodifluoromethane. The invention of that application employs a "tube-in-tube" construction wherein the inner tube is reciprocable within the outer tube. The annular space between the tubes forms the fluid inlet passage. With the inner tube in a normally retracted position, an exhaust valve at the rear of the tube is closed and an inlet valve near the tip of the instrument is open. Thus the instrument is filled to the exhaust valve with liquid refrigerant at room temperature and the probe is normally warm. The instrument is maintained in this normal condition by means of a resilient bellows which is exposed to fluid inlet pressure. When an external lever is actuated, the inner tube is advanced against the force of the bellows to close the inlet valve and open the exhaust valve. This permits the liquid refrigerant to be discharged to exhaust. The inlet valve defines a small metering orifice which permits the liquid refrigerant to flow into a cooling chamber at the probe tip where it boils and reduces the temperature of the probe to the desired level.

It would be desirable under certain circumstances to provide cryosurgical instruments of this general type which would be cooled by expansion of a gas, such as carbon dioxide, rather than by evaporation of a liquid refrigerant. However, instruments of the type heretofore proposed are unsuited for use with gaseous refrigerants for several reasons, the chief reason being that of safety. The pressure of a gaseous refrigerant, such as carbon dioxide, is quite high and may be, for example, in the range of 450—860 p.s.i.g. As explained above, the resilient bellows employed in prior art cryosurgical instruments are exposed to the fluid inlet pressure. It will be readily appreciated that a bellows containing gases under pressures of this magnitude could present a serious rupture hazard. Furthermore, instruments of this type are actuated by means of a finger operated lever and it is desirable that these instruments be relatively small and easily hand-held. This necessarily imposes a limit on the length of the lever and, thus, on the moment arm for compressing the bellows and varying the tip temperature. While this presents no problem when using liquid refrigerants, the high pressure of the gas refrigerant means that excessive force must be exerted by the surgeon to control tip temperature. This may result in finger fatigue and reduced hand steadiness.

Accordingly, it is a primary object of the present invention to provide an improved cryosurgical instrument which is adapted to utilize either liquid or gaseous refrigerant fluids.

Other objects are to provide such an instrument which will safely contain gas refrigerants under high pressure and which includes various operating and structural advantages over instruments known to the prior art.

2

SUMMARY OF THE INVENTION

In accordance with the present invention, there is provided a cryosurgical instrument comprising a housing with a tubular probe extending outwardly from the housing, and terminating in an enclosed tip. A first inlet valve seat member is positioned within the probe. A fluid delivery tube is reciprocably mounted within the probe, one end being within the casing and the second end cooperating with the first inlet valve seat member to form an inlet valve defining a metering orifice when in its closed position. A fluid discharge passage is formed by the annular space between the probe and the delivery tube. A first exhaust valve seat member is positioned within the casing and a second exhaust valve seat member is mounted on the fluid delivery tube and cooperates with the first exhaust valve seat member to form an exhaust valve communicating with the annular discharge passage. Resilient means normally maintains the delivery tube in a retracted position relative to the probe to open the inlet valve and close the exhaust valve. Actuating means is provided which is selectively operable to advance the delivery tube to close the inlet valve and open the exhaust valve. A fluid supply is connected to the delivery tube and a fluid exhaust tube is connected to the exhaust valve.

BRIEF DESCRIPTION OF THE DRAWINGS

The manner in which the objects of this invention are achieved will be more apparent from the following description, the appended claims and the figures of the attached drawings wherein:

FIG. 5 is an enlarged cross section of the inlet valve portion of the instrument in its open position;

FIG. 6 is an illustration similar to that of FIG. 5 showing the inlet valve in its closed position;

FIG. 7 is a view taken substantially along the line 7—7 of FIG. 2; and

FIG. 8 is an enlarged cross section of a portion of a modified instrument embodying this invention.

DESCRIPTION OF THE PREFERRED EMBODIMENTS

Figure 1:
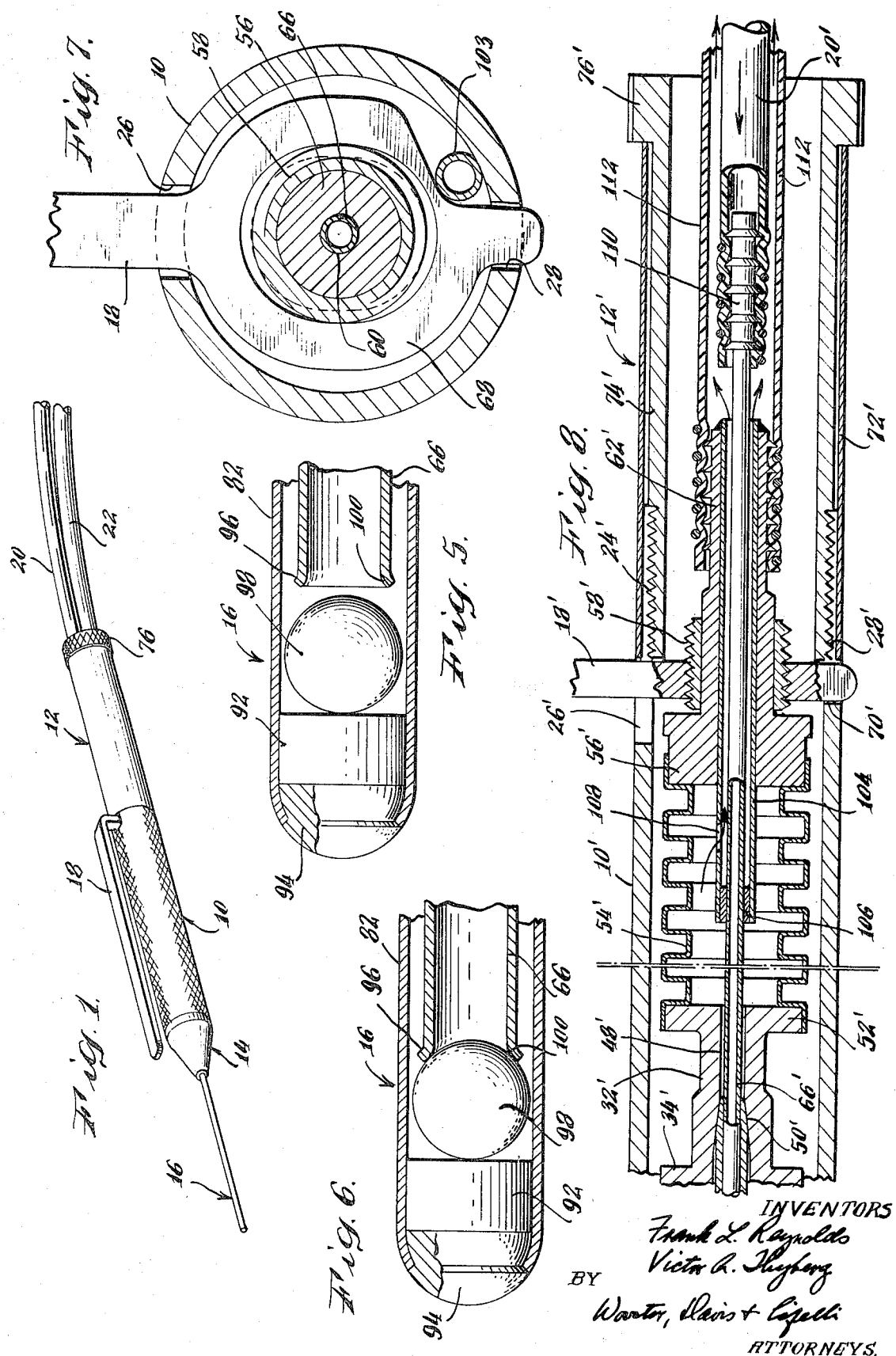
FIG. 1 is a perspective view of a cryosurgical instrument in accordance with this invention.
Figure 2:
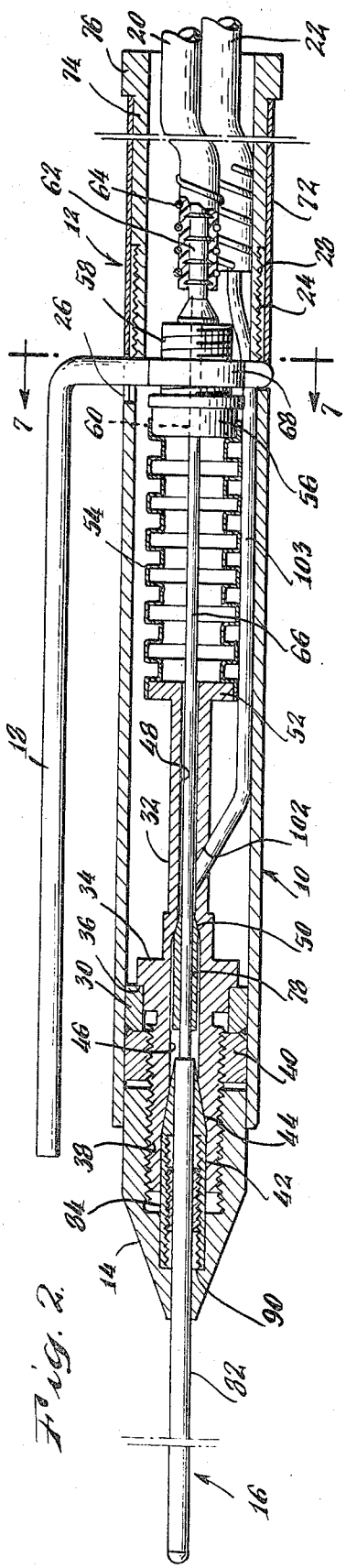
FIG. 2 is an enlarged longitudinal cross section of the instrument of FIG. 1 in its normally warm position.

With particular reference to FIGS. 1—7 of the drawings there is illustrated a cryosurgical instrument comprising a tubular central housing member 10 and rear housing member 12. A conical nose member 14 is mounted at the forward end of housing member 10 and from it extends probe 16. An operating lever 18 is mounted externally of the housing 10 and the instrument is provided with refrigerant inlet tube 20 and exhaust tube 22. From FIG. 2 it will be noted that the rear portion of central housing member 10 is of reduced thickness and provided with an internal thread 24. Furthermore, this threaded portion defines diametrically opposed slots 26, 28 extending longitudinally of the housing member, from its right end as seen in FIG. 2. Slot 26, as illustrated, is longer than slot 28 to provide clearance for lever 18 as will be hereinafter explained. Secured within the forward end of central housing member 10 is a positioning ring 30.

Fixedly mounted along the axis of housing member 10 is a generally cylindrical core member 32 which is formed with a radially extending flange 34 having a circumferential recess 36 which fits snugly against positioning ring 30 as illustrated. An externally threaded forward portion 38 extends outwardly from the front end of housing member 10 and the core member 32 is held securely in position by means of a slotted nut 40 threaded on the forward portion 38 to engage positioning ring 30 within housing member 10. The core member 32 defines an axial passage having an enlarged forward portion 42 connected by a conically tapered portion 44 to a central portion 46 of intermediate diameter. Central portion 46 in turn communicates with a still smaller discharge passage 48 through a conically tapered valve seat 50. The rearwardmost end of core member 32 terminates in a flange 52 to which is secured the forward end of a resilient metal bellows 54. Closing the back end of bellows 54 is a pivot plug 56 having a threaded portion 58. Pivot plug 56 defines an axial passageway 60 which extends through a barbed tube fitting 62 mounted on the rear of pivot plug 56. The inlet tube 20 which may be of plastic, such as Teflon or similar material, is mounted on tube fitting 62 and frictionally secured by means of a coil spring 64. Fixedly mounted in the passageway 60 is the end of a fluid delivery tube 66 which extends axially through housing member 10 and core member 32 into the probe 16 as will hereinafter be described.

Figure 3:
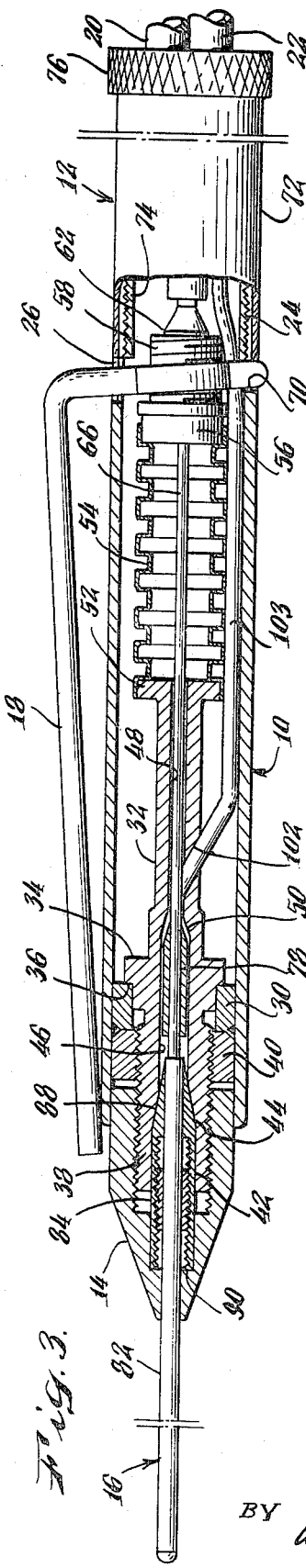
FIG. 3 is a cross section similar to FIG. 2, showing the instrument actuated to its cold position.

The lever 18 is substantially L-shaped. The short leg of the L includes a substantially circular portion 68 which defines an internally threaded opening engaging the threaded portion 58 of pivot plug 56. The end of the short leg extends through slot 28 and is rotatable about a pivot point 70 (FIG. 3). When the circular portion 68 of lever 18 has been threaded onto threaded portion 58 of the pivot plug it is deformed at the sides by squeezing with a suitable tool. This is shown in exaggerated form in FIG. 7. The normal clearance between the threads results in the illustrated deformation which causes the lever 18 to grip the pivot plug more closely at the sides and, at the same time, increases the top and bottom thread clearance. This provides a trunnion effect so that, thereafter, when lever 18 is depressed, the forward force exerted on pivot plug 56 lies along the center line of the instrument to prevent lateral tipping forces from being applied to delivery tube 66.

The rear housing member 12 is in the form of a cylindrical sleeve 72 which is held in place by means of a bushing 74 having its forward end threaded to engage threads 24. Bushing 74 includes a knurled rear shoulder 76 retaining the end of cylindrical sleeve 72.

Figure 4:
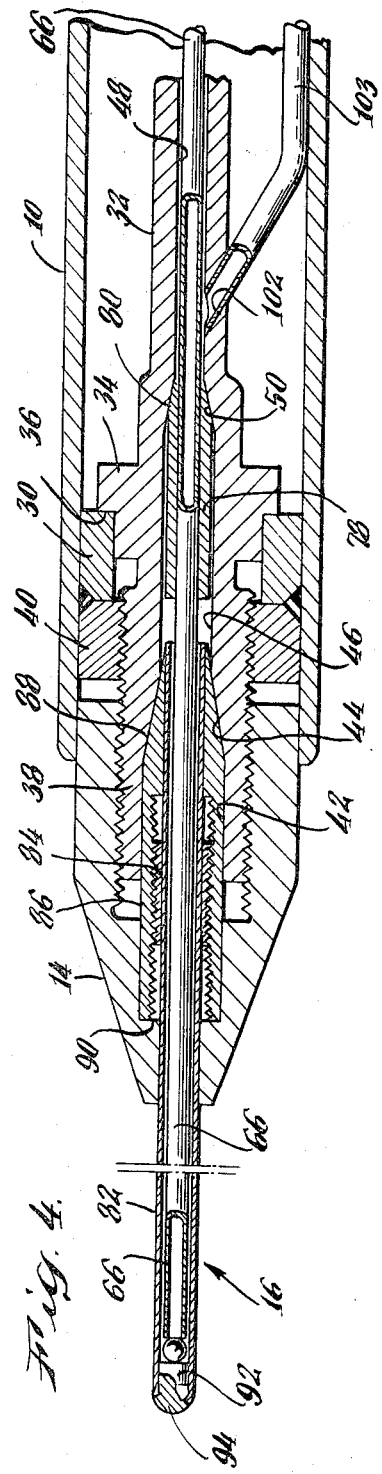
FIG. 4 is an enlarged cross section of the forward portion of the instrument of FIG. 2.

The construction of the forward end of the instrument of this invention will be best understood by reference to FIG. 4. As illustrated therein, delivery tube 66 is provided with a sleeve 78 having a tapered valve seat 80 which seats against valve seat 50 to form an exhaust valve. The probe 16 comprises an outer tube 82 upon which is mounted an externally threaded sleeve 84. Threaded upon sleeve 84 is a sealing member 86 which fits snugly within the forward portion 38 of core 32 and terminates in a taper 88 which fits within tapered portion 44 to provide a fluid tight seal. Sealing is further effected by means of a nose member 14 which includes a forward shoulder 90 which maintains taper 88 and tapered portion 44 in tight engagement.

The forward portion of the probe is most clearly illustrated in FIGS. 5 and 6 where it will be seen that the end of tube 82 is closed by a plug 92 of a suitable heat conductive material, such as silver, over which the end of tube 82 is crimped. A rounded nose 94 of silver solder completes the tip of the probe. The forward end of delivery tube 66 may advantageously be flared slightly, as at 96, to seat against a steel ball 98 which is otherwise loosely contained within tube 82. A small metering orifice 100 is provided in this flared portion to permit a carefully metered flow of refrigerant when the instrument is in its freezing condition.

Referring to FIGS. 2—4 it will further be noted that core member 32 is provided with an angled opening 102 which contains the end of an exhaust line 103. The exhaust line 103 extends through the instrument housing and, at its rear end, is provided with a tube fitting (not shown) similar to fitting 62 upon which is similarly mounted the exhaust tube 22.

To explain the operation of this invention, it will first be assumed that the instrument is in its normally warm condition as illustrated in FIGS. 2, 4 and 5. In this condition lever 18 is not depressed and the normal resilience of bellows 54 maintains pivot plug 56 in its rearwardmost position. It will be noted that tube 66 is also in its rearwardmost position and that the flared portion 96 is retracted from ball 98 (FIG. 5). Furthermore, sleeve 78 is so positioned that valve seat 80 is seated tightly against valve seat 50. The inlet tube 20 is connected to a source of pressurized fluid refrigerant. This fluid refrigerant fills delivery tube 66 and the annular passage between tube 66 and tube 82 up to the exhaust valve formed by valve seats 50 and 80. This refrigerant is substantially at room temperature, as is probe 16.

Assume now that the surgeon depresses lever 18 to the position shown in FIG. 3. The lever pivots about the pivot point 70 and advances pivot plug 56 and the associated delivery tube 66. Sleeve 78 begins to advance, thereby opening a passage for the escape of the fluid refrigerant into exhaust line 103 and exhaust tube 22. This provides an initial flushing action to purge the system of contaminate particles and air bubbles. Forward motion of delivery tube 66 is completed when flared portion 96 engages ball 98, as shown in FIG. 6. The inlet valve formed by these members thereby prevents the escape of any major quantity of refrigerant. However, metering orifice 100 still permits the escape of a minute measured quantity of refrigerant to provide the cooling effect. When liquid refrigerants are employed, this is a boiling effect which rapidly cools the probe tip, the vapor escaping through the discharge passage formed between tubes 82 and 66, passing through the exhaust valve, and exiting via exhaust line 103 and exhaust tube 22. When a gaseous refrigerant, such as carbon dioxide, is employed, the pressurized refrigerant contained within delivery tube 66 expands rapidly through orifice 100 causing a similar cooling effect, the expanded gases escaping by a similar route. It is important to note at this point that, as the bellows 54 is connected to the exhaust line 103, it is never exposed to the full pressure of the refrigerant supply. However, a pressure slightly above atmospheric is produced within the bellows. This pressure serves a useful function by assisting the bellows to expand when lever 18 is released to retract delivery tube 66. This permits the system once more to fill with warm fluid, thereby rapidly defrosting the probe tip. It should also be noted that, as ball 98 is free, it will rotate by reason of normal turbulence so that its surface is washed free of any contaminate particles which might interfere with the valving action.

As pointed out above, the pressure of a gas refrigerant may be in the range of 450—860 p.s.i.g. In addition to the fact that the bellows 54 is never exposed to such pressures, it should also be pointed out that these pressures are contained solely within tubular threaded members which are easily capable of containing such pressures. Furthermore, the extremely small size of the instrument of this invention prevents any appreciable additional force being required to depress lever 18. To appreciate the size of this instrument, it may be pointed out that, in one actual embodiment, the ball 98 has a diameter of .050 inch and the movement of delivery tube 66 between its extreme positions is .010 inch.

As pointed out above, the instrument which has been described heretofore is fully capable of operating with either a liquid or a gas refrigerant. However, it has been discovered that additional improvements may be incorporated into an instrument designed to operate solely with gaseous refrigerants. For example, in the instrument thus far described the inlet tube 20 and exhaust tube 22 are in side-by-side relationship. This creates a certain amount of torque which must be overcome by the surgeon in manipulating the instrument. While a tube-in-tube construction might be preferred, it has been discovered from experience that a vaporized liquid refrigerant exhausting along the outer tube causes sufficient precooling of incoming liquid that proper and rapid warming of the probe tip is hampered. Accordingly, the construction so far described was adopted, resulting in the use of side-by-side tubes. This construction also requires that the length of core member 32 be sufficient to permit exhaust line 103 to be connected thereto.

In FIG. 8 there is illustrated a modified form of construction, primarily for use with a gaseous refrigerant, wherein a tube-in-tube arrangement is provided, thus removing the torque problem mentioned above and also permitting shortening of the instrument. In the modification of FIG. 8, many of the parts are similar to those previously described and are given similar reference numerals with a prime attached. In this arrangement it will be noted that the pivot plug 56' does not carry delivery tube 66' directly but, instead, carries an exhaust collector tube 104 which is of larger diameter than delivery tube 66'. Collector tube 104 encircles delivery tube 66' and is secured thereto by means of a soldered sleeve 106 at its forward end. An exhaust port 108 is provided in the exhaust collector tube 104 within the bellows 54'. The rear end of delivery tube 66' is provided with a barbed tube fitting 110 to which is secured the inlet tube 20' in the same fashion as previously described. An exhaust tube 112 of sufficiently larger diameter than inlet tube 20' is connected to the tube fitting 62'. The flow of the gaseous refrigerant is illustrated by arrows on FIG. 8 and is believed to be readily understandable. It will be understood that the exhaust tube 112 may have its remote end positioned anywhere along the inlet tube 20' wherever desired to permit the remote escape of spent exhaust gas.

It is believed that the many advantages of this invention will now be apparent to those skilled in the art. It will also be apparent that a number of variations and modifications may be made in this invention without departing from its spirit and scope. Accordingly, the foregoing description is to be construed as illustrative only, rather than limiting. This invention is limited only by the scope of the following claims.

We claim:

1. A cryosurgical instrument which comprises: a housing; tubular probe means extending outwardly from said housing and terminating at an enclosed tip; a first inlet valve seat member within said probe means; a fluid delivery tube reciprocably mounted within said probe means having a first end within said housing and a second end forming a second inlet valve seat member cooperable with said first inlet valve seat member to form an inlet valve defining a metering orifice when in its closed position, said probe means and delivery tube defining an annular fluid discharge passage therebetween; a first exhaust valve seat member positioned within said housing; a second exhaust valve seat member on said fluid delivery tube cooperable with said first exhaust valve seat member to form an exhaust valve communicating with said discharge passage; resilient means normally maintaining said delivery tube in a retracted position relative to said probe means to open said inlet valve and close said exhaust valve; actuating means selectively operable to advance said delivery tube to close said inlet valve and open said exhaust valve; fluid supply means connected to the first end of said delivery tube; and fluid exhaust tube means in fluid flow relationship with said exhaust valve.

2. The instrument of claim 1 wherein said resilient means comprises a bellows.

3. The instrument of claim 2 wherein the interior of said bellows is open to said fluid exhaust tube means.

4. The instrument of claim 1 wherein said first inlet valve seat member comprises a ball positioned within the tip of said probe means and having a diameter greater than the internal diameter of said delivery tube.

5. The instrument of claim 4 wherein said ball is free when said delivery tube is in its retracted position.

6. The instrument of claim 1 wherein said actuating means comprises: a pivot plug positioned within said housing and secured to said resilient means, the first end of said delivery tube being secured to said pivot plug; and lever means extending outwardly of said housing and including a portion pivotally engaging the outer surface of said pivot plug, said engagement being essentially at diametrically opposed points on said outer surface lying in a plane including the longitudinal axis of said delivery tube and perpendicular to the plane of motion of said lever means.

7. The instrument of claim 6 wherein the engaging portion of said lever means is threaded onto said pivot plug and inwardly deformed at said points.

8. The instrument of claim 2 wherein said bellows is in series fluid flow relationship between said exhaust valve and said exhaust tube means.

9. The instrument of claim 8 wherein said actuating means comprises a pivot plug mounted in the outlet end of said bellows and wherein said fluid exhaust tube means comprises an exhaust collector tube secured in said pivot plug and having a first end within said bellows defining a fluid exhaust inlet opening, said collector tube being secured to said delivery tube in coaxial spaced relationship thereupon to define a fluid exhaust passage therebetween.

10. The instrument of claim 9 wherein said first inlet valve seat member comprises a ball positioned within the tip of said probe means and having a diameter greater than the internal diameter of said delivery tube.